United States Patent

Bohme

Patent Number: 4,565,026
Date of Patent: Jan. 21, 1986

[54] REMOTE RELEASE DEEP TROLLING SYSTEM

[76] Inventor: August E. Bohme, 5759 Larson Pl., West Vancouver, British Columbia, Canada, V7W 1S5

[21] Appl. No.: 532,370

[22] Filed: Sep. 15, 1983

[51] Int. Cl.⁴ ............................................. A01K 91/00
[52] U.S. Cl. ..................................... 43/43.12; 43/17.2
[58] Field of Search ................................ 43/17.2, 43.12

[56] References Cited

U.S. PATENT DOCUMENTS

| | | | |
|---|---|---|---|
| 2,359,588 | 9/1944 | Shea | 43/43.12 |
| 3,619,932 | 11/1971 | Maxwell | 43/43.12 |
| 3,765,118 | 4/1973 | Reitler | 43/43.12 |
| 3,925,920 | 12/1975 | Walker | 43/43.12 |

Primary Examiner—Nicholas P. Godici
Assistant Examiner—C. McKee
Attorney, Agent, or Firm—Carver & Co.

[57] ABSTRACT

According to one aspect of the invention, a fishing line connecting device can be connected to a first line or cable for use below the surface of a body of water. The device can be releasably connected to a second line. There is a release mechanism for releasing the second line when the release mechanism is struck. According to another aspect of the invention, there is an apparatus for adapting a fishing rod and reel for use with a depth seeking weight. The apparatus has a bracket for holding the rod in a substantially horizontal position, a guide pulley for guiding a line wound on the reel and passing downwardly into the water and bollards between the bracket and the guide pulley for restraining movement of the line between the rod and the guide pulley. According to another aspect of the invention, there is a release device having a first member with an aperture and a second member having a portion tapering towards one end thereof and shaped to wedge within the first aperture so the one end passes through the aperture. The one end has another aperture for connecting a spring scale to set a force wedging the second member in the first aperture.

9 Claims, 14 Drawing Figures

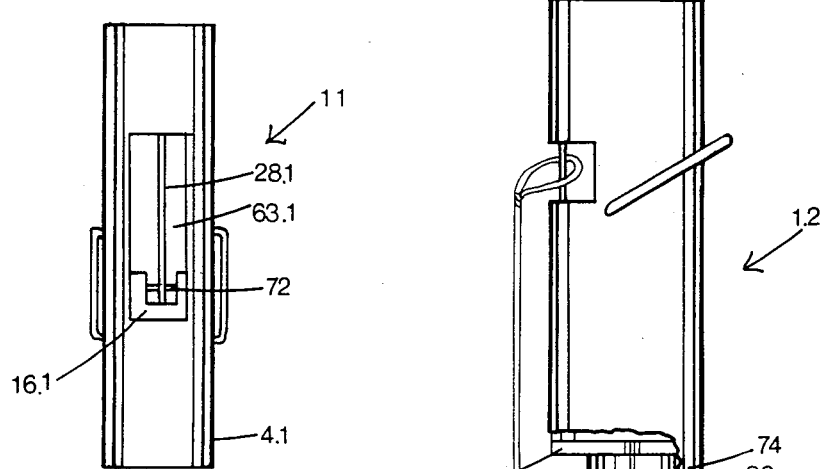
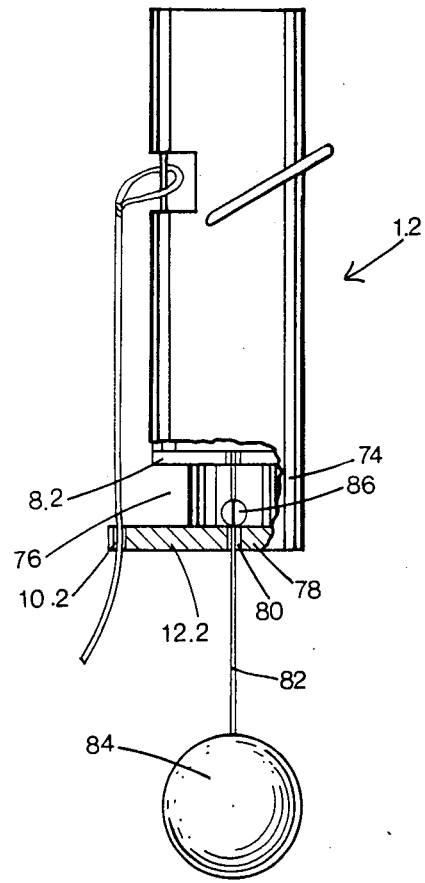
FIG.3
FIG.4

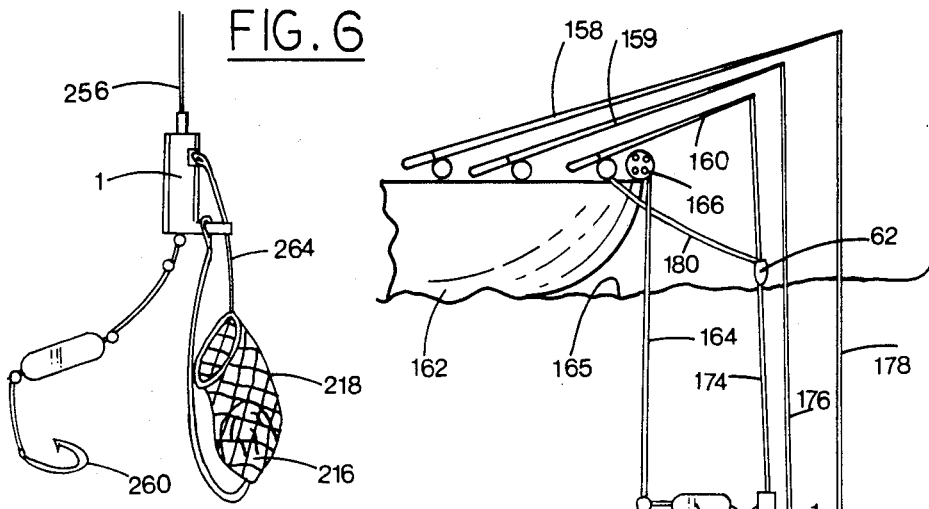
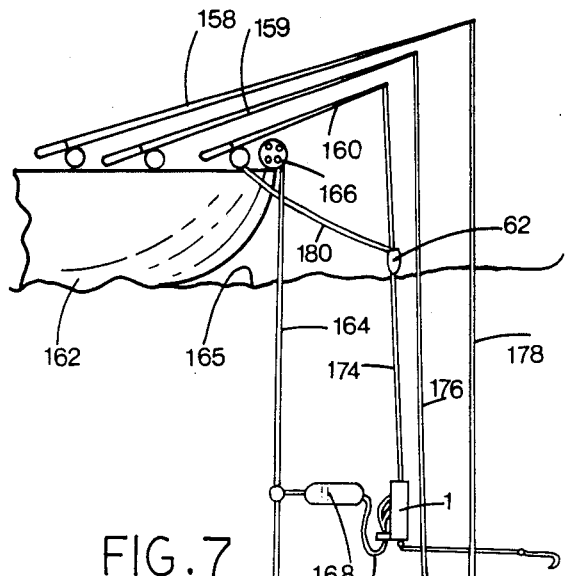
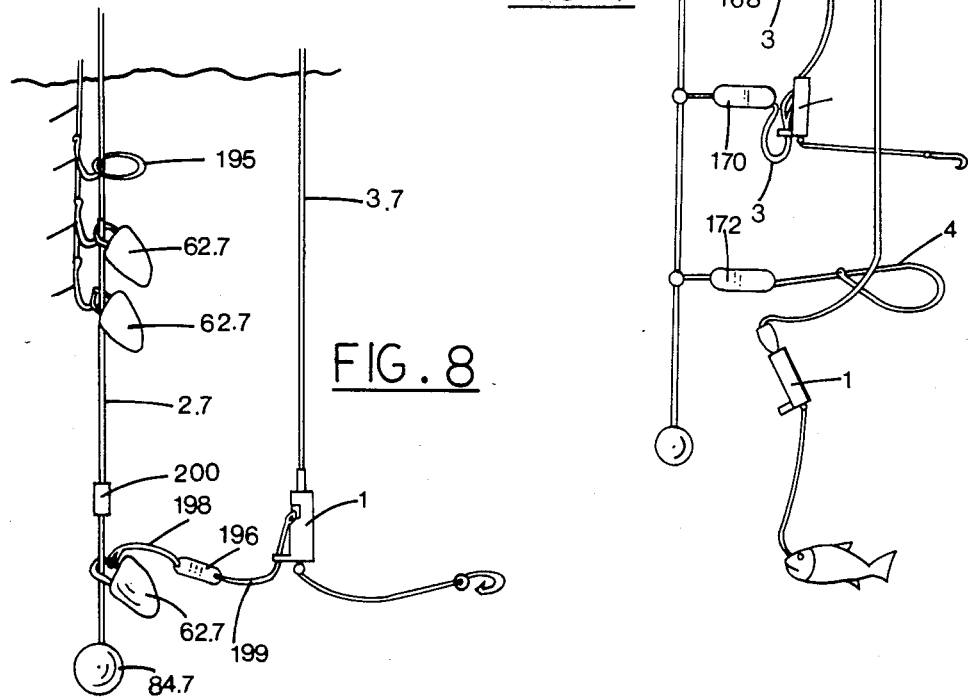

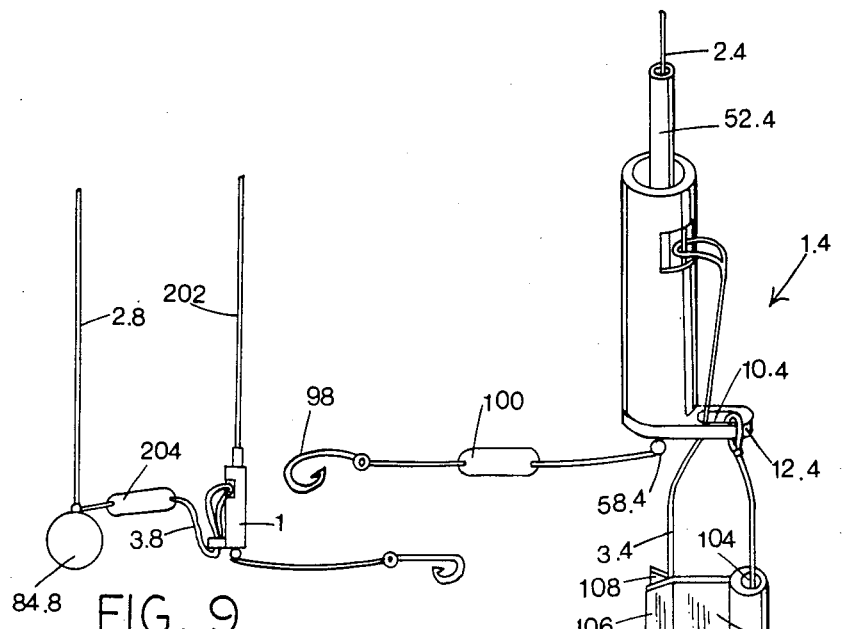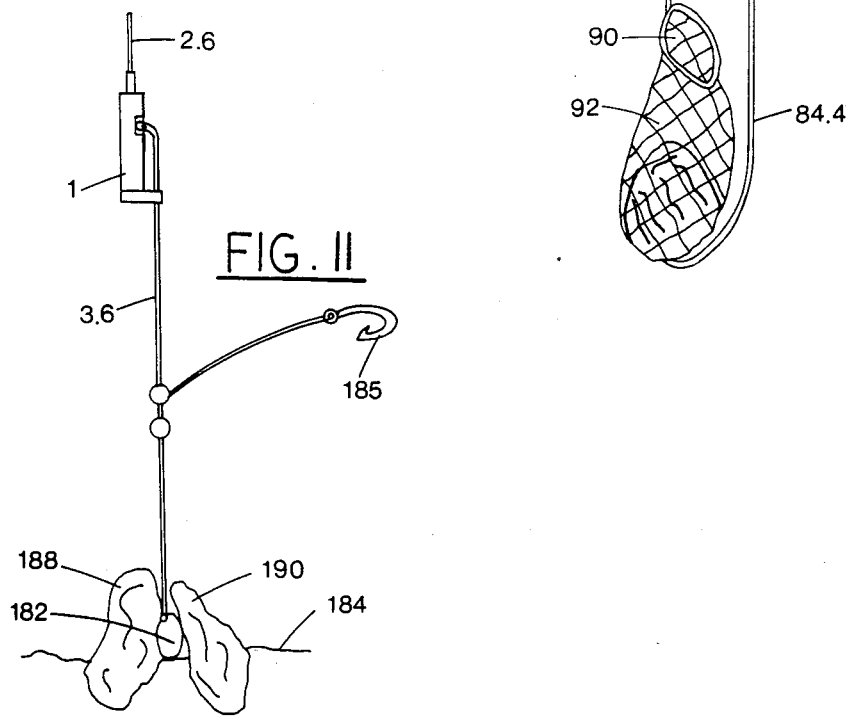

REMOTE RELEASE DEEP TROLLING SYSTEM

BACKGROUND OF THE INVENTION

This invention relates to fishing equipment, namely to improved systems for deep trolling.

Conventional downriggers employ a relatively heavy downrigger line or cable with a heavy weight on the end. This weight carries the cable to the desired fishing depth. The fisherman employs a separate reel and line for fishing. The fishing line is releasably secured to the downrigger line just above the weight so the weight carries the fishing tackle to the desired depth. Typically, the release mechanism employs a wedge-shaped member fitted, to a tighter or looser degree, within an aperture on another member. When a fish strikes the hook on the end of the fishing line, the two members are intended to pull apart, releasing the fishing line from the downrigger line. Thus, the fisherman is then supposed to be free to reel in the fish without interference from the downrigger line.

However, in practice, certain difficulties arise. For example, the fisherman must wedge the two members together with sufficient force so they are not prematurely released under horizontal or vertical tension. At the same time, the force must not be so large so that the device fails to release when a fish strikes the hook. The force exerted to push the two members together depends on certain factors such as the size of the fish being sought. However, the fisherman has no accurate means of determining the correct force and the result is that the two members frequently release prematurely or fail to release when a fish strikes.

SUMMARY OF THE INVENTION

According to one aspect of the invention, a fishing line connecting device has means for connecting the device to a first line or cable for use below the surface of a body of water. There is means for releasably connecting the device to a second line and release means for releasing the second line when the release means is struck.

Preferably, the release means is adapted to be struck by a weight slidably engaging the first line or cable and dropped downwardly to the device.

In a preferred form, the device comprises a hollow outer member and a second member slidably received in the outer member. The outer member has an aperture in a side thereof. The means for releasably connecting comprises a pin on the inner member adjacent the aperture and having free end. The second member has a normal position where the pin extends across the aperture to connect a loop of the second line about the pin. The second member is displaceable relative to the first member by the striking weight so the free end moves across the aperture to release the loop.

According to another aspect of the invention, there is an apparatus for adapting a fishing rod and reel for use with a depth seeking weight. The apparatus comprises bracket means for holding the rod in a substantially horizontal position, guide pulley means for guiding a line wound on the reel and passing downwardly into the water and bollard means between the bracket means for restraining movement of the line between the rod and the guide pulley means.

According to a further aspect of the invention, a release device has a first member with an aperture and a second member having a portion tapering towards one end thereof and shaped to wedge within the aperture so the one end passes through the aperture. The one end has a means for connecting a force setting device to set a force wedging the second member in the aperture.

BRIEF DESCRIPTION OF THE DRAWINGS

In the drawings:

FIG. 3 is a side view of a second embodiment of a fishing line connecting device;

FIG. 4 is a side view, partly broken away, of a third embodiment of a fishing line connecting device connected to fishing tackle;

FIG. 6 is a side view of the fishing line connecting device and other fishing tackle connected to the fishing line of FIG. 5;

FIG. 7 is a side view of three fishing rods used simultaneously with a single downrigger line in combination with three of the devices of FIG. 1;

FIG. 8 is a side view of fishing apparatus used with the device of FIG. 1 and a plurality of weights used to reconnect the device to the downrigger line near the depth seeking weight;

FIG. 9 is a side view of fishing apparatus including the device of FIG. 1 used with a single rod and downrigger line;

FIG. 10 is a perspective view of a fishing tackle combination including the device of FIG. 1 and a bag for releasably holding a depth seeking weight;

FIG. 11 is a side view of the device of FIG. 1 used in combination with apparatus used to release a snag;

DESCRIPTION OF THE PREFERRED EMBODIMENTS

Figure 2:
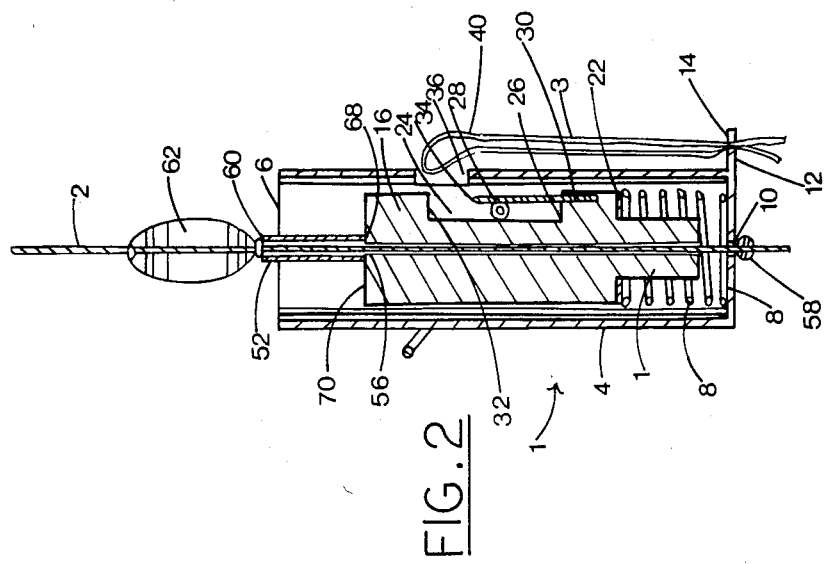
FIG. 2 is a sectional view taken along line 2—2 of FIG. 1.
Figure 1:
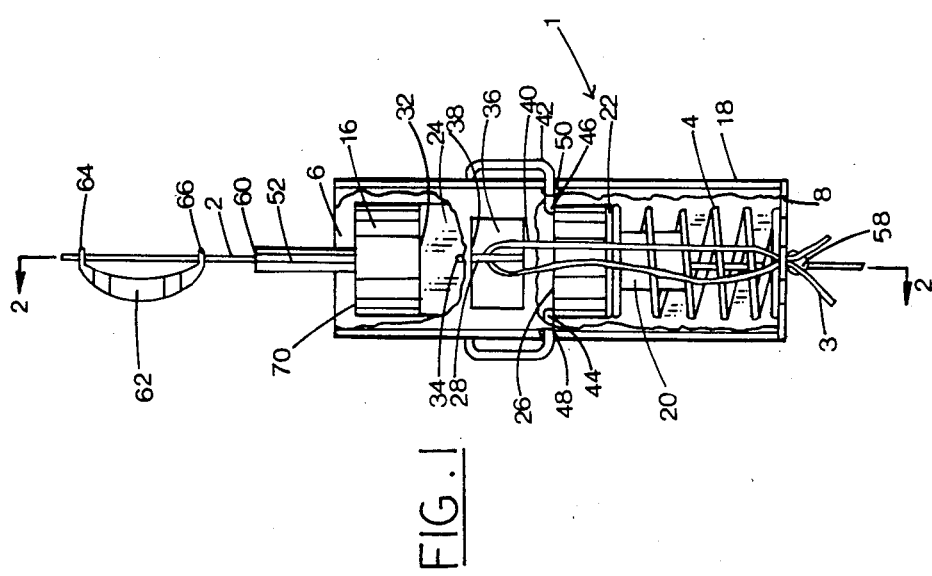
FIG. 1 is a front view, partly broken away, of a first embodiment of a fishing line connecting device.

Referring to FIGS. 1 and 2, these illustrate a fishing line connecting device 1 connected to a first line or cable, in this case a downrigger cable 2. The device is also releasably connected to a second line 3 as shown in FIG. 1.

The device has an outer member or housing 4 in the form of a hollow cylinder. The housing has an open top 6 and a disc-shaped bottom 8 having a central aperture 10. The bottom has a lip 12 extending from one side thereof. The lip is provided with an aperture 14.

A substantially cylindrical second member or plunger 16 is slidably received in the housing for reciprocation in the longitudinal direction which is the vertical direction illustrated in FIGS. 1 and 2. The plunger is resiliently biased towards a normal position illustrated in FIG. 1 by a coil spring 18 located above the bottom of the housing. The plunger has a bottom projection 20 of smaller diameter which fits within the coil spring. A washer 22 fits over the projection and rests ontop of the coil spring.

Plunger 16 has a cut out portion 24 on the side thereof having a bottom surface 26. A pin 28 is tightly fitted within an aperture 30 projecting downwardly from bottom surface 26. The cut out portion 24 has a top surface 32 and the pin 28 has a free end 34 spaced apart from the top surface.

There is a rectangular aperture 36 in the side of housing 4. In the normal position of FIG. 1, it may be observed that the pin 28 extends completely across the aperture due to the fact that the free end 34 of the pin is above the top 38 of the aperture. It may be observed in FIG. 1 that a loop 40 on line 3 is thus secured on the pin.

Plunger 16 is kept within the housing by a retaining ring 42 having two ends 44 and 46 projecting into the housing through apertures 48 and 50. Upward and sideways movement of the plunger is limited when ends 44 and 46 contact the bottom surface 26 of the cut out portion of the plunger.

The plunger is displacable downwardly to the position of FIG. 1 where the coil spring is compressed. In moving between the normal position of FIG. 1 and the displaced position of FIG. 2, the free end 34 of the pin moves across the aperture 36 in the housing. This releases the loop 40 of the second line 3 as shown in FIG. 2.

The downrigger cable 2 fits through a length of tubing 52 which projects above the open top 6 of the housing in the normal position of FIG. 1. The cable then extends through an aperture 56 extending longitudinally through plunger 16 and finally through aperture 10 in the bottom of the housing. The apertures 56 and 10 serve as means for connecting the downrigger cable to the device. A split shot 58 is crimped on the end of the cable to keep the cable from pulling out of the device.

The length of tubing 52 serves as means for releasing the second line 3 when the tubing is struck on its top 60 by a weight 62. Downrigger cable 2 fits through eyelets 64 and 66 on the weight. When the fisherman wishes to release line 3, he simply drops weight 62 from above. The weight drops until it strikes the top 60 of length of tubing 52. The length of tubing has a bottom 68 which strikes top 70 of the plunger. This compresses coil spring 18 and moves the plunger to the position of FIG. 2. In the process, loop 40 on second line 3 is released from the free end 34 of pin 28 as the free end passes across the aperture 36 in the housing.

FIG. 3 illustrates a slight variation 1.1 of the device shown in FIGS. 1 and 2. In this case, the pin 28.1 is connected to plunger 16.1 by a hinge 72. This allows the pin to swing outwardly through aperture 63.1 in housing 4.1. In some cases this may better assure release of the second line.

FIG. 4 illustrates another variation of the device 1.2 having a projection 74 below the bottom 8.2 of the housing. The projection is hollow with an opening 76 on one side thereof. Lip 12.2 and aperture 10.2 are located on the projection. The projection has a bottom 78 with an aperture 80. A weight 84 is typically carried on a line 82. The line is prevented from slipping through aperture 80 by a split shot 86 crimped on top of the line.

FIG. 10 illustrates another variation of the device 1.4 used for releasably holding a weight 84.4. The device 1.4 is essentially similar to the device 1 shown in FIGS. 1 and 2. Second line 3.4 passes freely through aperture 10.4 and is connected to net bag 92 to one side of its open top end 90. The bag has a closed bottom end 94 connected to a fourth line 96. The opposite end of line 96 is connected to aperture 10.4. This device is adapted for use with a single fishing line 2.4 instead of a downrigger cable. The line 2.4 passes through the device and has a hook 98 connected to its free end. Split shot 58.4 prevents the line from moving upwardly through the device. The weight 84.4 is used to take the hook and attached dodging device 100 to the required depth and maintain them at this depth until a fish strikes. At this point, the fisherman will wish to release the weight 84.4. This is accomplished by dropping a weight, similar to weight 62 of FIGS. 1 and 2, down the fishing line 2.4 to strike length of tubing 52.4. This releases line 3.4 which slips through aperture 10.4 and allows the open end 90 of the bag to fall below the weight 84.4. This allows the weight to fall through the open end. The fisherman can then play the fish without the restriction of the weight. Obviously, weight 84.4 should be of a disposable nature such as a rock.

When the boat moves through the water, there may be a tendency for lines 3.4 and 96 to tangle. For this reason, a rudder 102 is used. Line 96 passes through an opening 104 at one end of the rudder. Line 3.4 is held by a pair of fins 106 and 108 which extend away from each in a V-shaped arrangement. A split shot 109, acting as a stop, holds the rudder in vertical position on the line. The rudder tends to keep lines 3.4 and 96 from tangling as the apparatus moves through the water.

Figure 14:
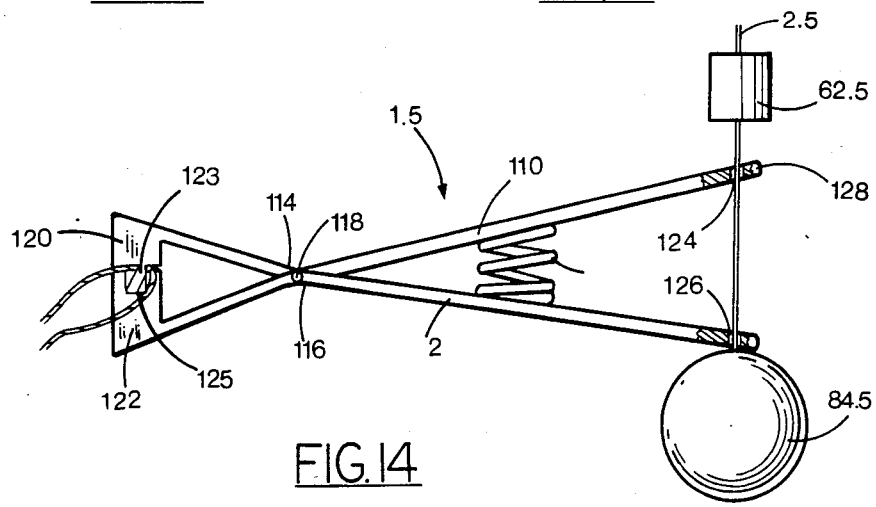
FIG. 14 is a side view of a fourth embodiment of a fishing line connecting device having means for releasing a line when a release means is struck.

FIG. 14 illustrates another variation of a fishing line connecting device. Device 1.5 is quite different in construction from the previous embodiments. This device comprises a pair of elongated members 110 and 112 which are generally L-shaped. Member 110 has a bend 114 while member 112 has the corresponding bend 116. The members are pivotally connected together by a pin 118. Member 110 has a jaw 120 at one end which normally meets a similar jaw 122 of member 112. A coil spring line extends between the members to bias the members so the jaws 120 and 122 are together. Jaw 120 has an outwardly angled pin 123 received in aperture 125 of jaw 122. The pin holds a loop of line 3.5 and releases the loop when the jaws move apart. The members have corresponding apertures 124 and 126 at the ends opposite the jaws. A downrigger line 2.5 passes through these apertures and has a weight 84.5 secured at the bottom end. End 128 of member 110 adjacent aperture 124 serves as means for releasing line 3.5. A weight 62.5 is dropped from above to strike this end of the member and compress spring 144. This opens jaws 120 and 122 to release the line.

Figure 12:
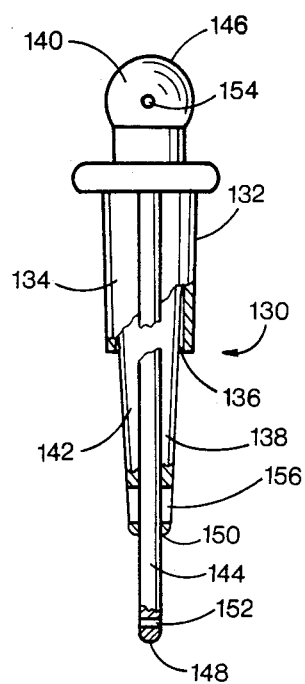
FIG. 12 is a side view of a release device having means for connecting a force setting device for wedging one member into another member.
Figure 13:
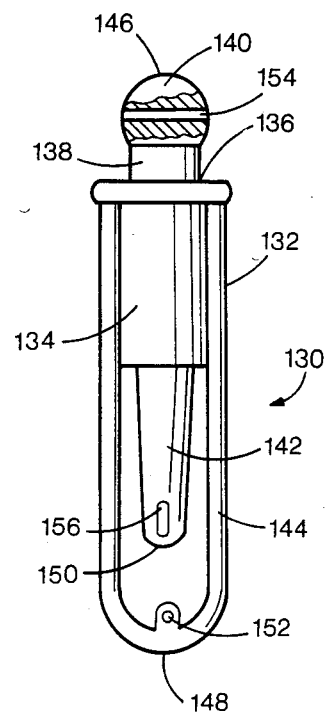
FIG. 13 is a plan view of the device of FIG. 12.

In some cases a fisherman may wish to release a fishing line, for example from a downrigger line, without using weight activated means. The embodiment shown in FIGS. 12 and 13 provides means for releasing the fishing line at a predetermined force. However, unlike prior art devices, the release force can be accurately set. Release device 130 has a first member 132 with a collar-like portion or hollow housing 134 having an aperture 136 passing completely therethough. The device also has a second member or pin 138 which has a ball-shaped portion 140 at one end and a tapering portion 142 extending from the ball-shaped protion. The tapering portion is shaped to fit within the aperture 136 of the first member. The first member also has a loop-shaped portion 144. When the first member receives the second member, as shown in FIGS. 12 and 13, the ball-shaped portion of the second member forms a first end of the device 146. A second end 148 of the device 130 is formed by a portion of the loop 144 extending further from the first end 146 than end 150 of the second member.

An aperture 152 comprises means for connecting the device to one line, for example a downrigger line. Another line, for example the fishing line, passes through an aperture 154 in the second member. The fishing line may be wedged between the first member and second member if the fisherman does not wish the fishing line to slide through aperture 154.

An elongated aperture 156 near end 150 of the second member comprises means for connecting a force setting device to set a force wedging the second member in aperture 136. The force setting device is normally a spring scale. In use, the fisherman normally grasps collarlike portion 134 with one hand and holds the spring scale with the other hand. The hook of the spring scale is fitted within aperture 156. The fisherman pulls on the scale to achieve any certain reading on the scale. A chart can be provided so the fisherman can determine what scale reading is required for the desired release force for the particular fishing conditions.

FIG. 7 illustrates how the previously described release devices may be used by three fishermen employing three separate fishing rods 158, 159 and 160 fishing from a boat 162 on the surface 165 of a body of water. A single downrigger line 164 is connected to a downrigger 166. Three separate dodgers 168, 170 and 172 are connected to the downrigger line by a conventional non-slip "S" stop or equivalent means. Each of the dodgers is connected to a line 3, each provided with a loop 4. The loops are releasably connected to fishing lines 174, 176 and 178 by three of the release devices 1. A weight 62 is slidably received on each of the fishing lines and is normally held near the surface of the water by a restraining line 180 as illustrated for fishing line 174 only. When a fish strikes any particular line, the weight 62.7 is dropped on that particular line to strike the corresponding release device 1. This releases the fishing line from the downrigger line and allows a fisherman to play the fish in a conventional manner. For example, fishing line 178 shown released from the downrigger line and dodger 172 in FIG. 7.

The previously described release devices can also be used when the fisherman is "mooching". This means dragging a mooching weight 182 along the bottom 184 as illustrated in FIG. 11. A rock or other disposable mooching weight may be used. The hope is that the mooching weight will stir up fish on the bottom so they may be attracted to hook 185. However, an inherent problem is the mooching weight becoming snagged as between two rocks 188 and 190 illustrated in FIG. 11. The fisherman in order to save his line, will have to release the mooching weight. For this purpose, the mooching weight is connected to a line 3.6 which is releasably connected to a release device 1. When the line becomes snagged, the fisherman drops a weight down fishing line 2.6 to release line 3.6. This allows line 2.6 and the release device to be reeled in while losing only the mooching weight and hook.

FIG. 8 illustrates an arrangement which allows the fisherman to begin fishing again after fishing line 3.7 is released from downrigger cable 2.7 without raising the downrigger cable and weight 84.7. This is done by fitting a plurality of slidable weights 62.7 over the downrigger cable. The weights are held by the same number of hooks 192 connected to a restraining line 194. Alternatively a plurality of rings such as ring 195 may be held by the hooks. The weights are connected to the rings as required. The release device 1 is connected to a dodger 196 having a line 198 on one side and a line 199 on the opposite side. Line 199 is releasably connected to the release device 1. When a fish is hooked, the fisherman drops a weight down line 3.7 to release the release device from the dodger. After the release device has been reeled in, it may be re-attached to the lowest weight 62.7 by another dodger and similar lines 198 and 199. The weight is removed from a hook and dropped down downrigger line 2.7 until it reaches weight 84.7. The fisherman may then resume fishing. A stop 200 in the nature of a split length of metal tubing, for example, is connected to a downrigger line 2.7 above the weight 84.7. This prevents the weight 62.7 from rising during normal fishing. However, stop 200 is sufficiently small to allow weight 62.7 to drop over the stop during the downward motion.

FIG. 9 illustrates an arrangement using the release device 80 releasably connected to downrigger cable 2.8 by a line 3.8. In this case, fishing line 202 and the release device are separated from the downrigger cable, weight 84.8 and dodger 204 when a weight is dropped down fishing line 202.

Figure 5:
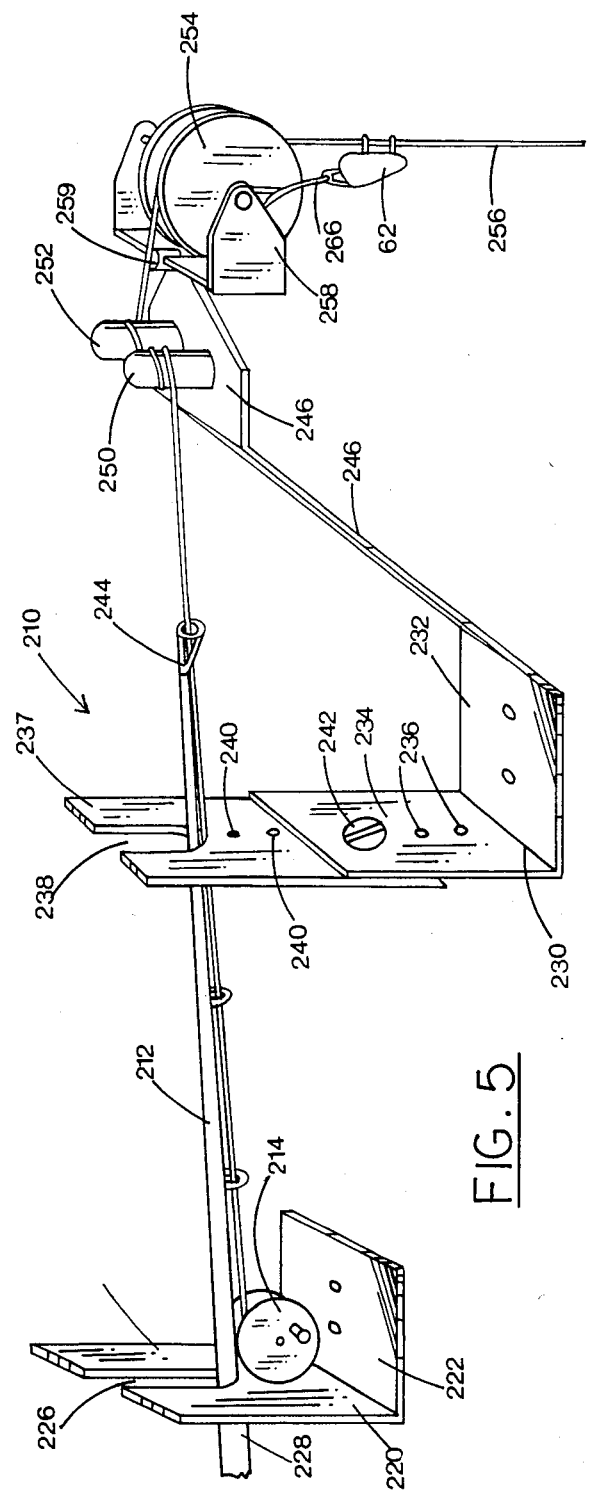
FIG. 5 is a perspective view of an apparatus for adapting a fishing rod and reel for use with a depth seeking weight.

FIG. 5 illustrates an apparatus 210 for adapting a fishing rod 212 and reel 214 for use with a relatively heavy depth seeking weight such as weight 216 held within a net bag 218 as shown in FIG. 6. The apparatus comprises a first bracket 220 with a bottom flange 222 for connecting the bracket to a boat. The first bracket has a bifurcated upper portion 224 on opposite sides of a slot 226 for receiving the rod near handle 228.

The apparatus also has a second bracket 230 with a bottom flange 232 for connecting the second bracket to a boat. The second bracket has a vertical flange 234 with a plurality of apertures 236. The second bracket has a bifurcated upper portion 237 on opposite sides of a slot 238. The upper portion has a plurality of apertures 240. The upper portion is connected to vertical flange 234 by at least one screw 242 passing through suitable apertures in the upper portion and the vertical flange such that the rod tip 244 is at the required height.

An angled arm 246 extends upwardly from flange 232 and is provided with a horizontal platform 248. A pair of bollards 250 and 252 are fixedly mounted on the platform. A guide pulley 254 for fishing line 256 is rotatably connected to a bracket 258 connected to the platform by a hinge 259. The upper portion 236 is adjusted so that the rod tip 244 is approximately at the vertical position from the bollards.

Referring to FIG. 6, the fishing line 256 is connected to a release device 1 shown in FIG. 1. A hook 260 is connected to the bottom of the fishing line. The net bag 218 has its open end releasably connected to the release device by a line 264 similar to the embodiment of FIG. 10.

This apparatus allows a regular rod and reel to be used with the heavy ballast or weight 216. The brackets hold the rod substantially horizontally so that the force of line 256 acts only on the reel and not on the rod, avoiding any tendency to bend the rod. The force on the reel is diminished by looping the fishing line as illustrated in FIG. 5 over the bollards which serve as line braking means. This takes up some of the strain. When a fish strikes the hook 260, the fisherman releases a weight 62 normally connected to bracket 258 by a line 266. The weight slides down the vertical portion of the fishing line until it strikes release device 1. This releases the open end 262 of the net bag and allows the weight 216 to drop. The fisherman also pulls the loops of the fishing line over the bollards and can remove the rod from the bracket and the line from the pulley 254 and play the fish in the usual manner. This apparatus completely removes the need for a downrigger and separate downrigger line.

The hinge 259 allows pivoting of pulley 254 and bracket 258 about a vertical axis through the hinge according to the direction of pull on line 256. At the same time, the bollards maintain a straight pull on the line extending towards the rod and reel.

What is claimed is:

1. A fishing line connecting device comprising means for connecting the device to a first line or cable for use below the surface of a body of water; a hollow outer member having an aperture in a side thereof; an inner member slidably received in the outer member and having a pin adjacent the aperture with a free end, the second member having a normal position where the pin extends across the aperture to secure a second line to the pin; release means adapted to be struck by a weight slidably engaging the first line or cable and dropped downwardly to the device, the second member being displaceable relative to the first member when the release means is struck by the weight so the free end of the pin moves across the aperture to release the second line; and resilient means biasing the second member towards the normal position, the means for connecting the device to the first line or cable comprising an aperture extending in a longitudinal direction through the outer member and the inner member, the inner member being slidable relative to the outer member in said longitudinal direction.

2. A device as claimed in claim 1, wherein the first member has an open top, the release means extending through the open top of the first member and having a bottom end contacting the second member.

3. An apparatus as claimed in claim 2, wherein the release means comprises a tube, the first line or cable extending through the tube.

4. A device as claimed in claim 1, wherein the pin is hingedly connected to the second member in a manner to permit the free end to swing out through the aperture when the release means is struck.

5. A fishing line release device comprises a first member having a means for connecting the device to a first line; a second member; means permitting movement of the second member with respect to the first member from a first position where a second line is secured between the members to a second position where the line is released; release means extending above the first member when the device is suspended from the first line so the release means is struck by a weight slidably embracing the first line and dropped down the first line to the device, the release means extending to the second member and being relatively movable with respect to the first member for moving the second member to the second position when the release means is struck by the weight.

6. A device as claimed in claim 5, wherein the first member is a hollow outer member and the second member is an inner member slidably received in the outer member, the outer member having an aperture in a side thereof, the inner member having a pin adjacent the aperture with a free end, the pin extending across the aperture in the first position, the release means including a top portion of the inner member, the pin being displaced across the aperture in the second position so the second line is released over the free end of the pin.

7. A device as claimed in claim 6, wherein the means permitting relative movement includes a resilient means between the members biasing the second member towards the first position and being deflectable so the second member moves to the second position when the release means is struck by the weight.

8. A device as claimed in claim 5, further including said weight, said weight being configured to strike the release means when dropped down the first line to the device.

9. A fishing line connecting device having means for connecting the device to a first line or cable for use below the surface of a body of water; means for releasably connecting the device to a second line; release means for releasing the second line when the release means is struck; a pair of elongated members pivotally connected together; and means resiliently biasing the members so a first two adjacent ends of the members are together and a second two adjacent ends are apart, the means for connecting to the first line or cable comprising apertures through the members near the second ends, the means for releasably connecting comprising the first two ends of the members and the release means comprising one of the second ends.

* * * * *